Jan. 26, 1943.　　　F. T. NEWELL　　　2,309,253
PIPE FITTING
Filed July 12, 1941　　　3 Sheets-Sheet 1

Jan. 26, 1943.                F. T. NEWELL                 2,309,253
                              PIPE FITTING
                           Filed July 12, 1941           3 Sheets-Sheet 2

INVENTOR
Frederick T. Newell
BY
Louis Prevost Whitaker
ATTORNEY

Jan. 26, 1943. F. T. NEWELL 2,309,253
PIPE FITTING
Filed July 12, 1941 3 Sheets-Sheet 3

INVENTOR
Frederick T. Newell
BY
Louis Prevost Whitaker
ATTORNEY

Patented Jan. 26, 1943

2,309,253

UNITED STATES PATENT OFFICE 2,309,253

PIPE FITTING

Frederick T. Newell, Bradford, Pa., assignor to Dresser Manufacturing Company, Bradford, Pa., a corporation of Pennsylvania Application July 12, 1941, Serial No. 402,112

3 Claims. (Cl. 285—108)

My invention consists in the novel features hereinafter described, reference being had to the accompanying drawings which illustrate two embodiments selected by me for purposes of illustration, and the said invention is fully disclosed in the following description and claims.

The present invention relates to fittings for use in pipe distribution systems to connect a lateral with a main. The fittings in accordance with the invention are particularly applicable to taking a lateral off of a high pressure gas main, the connection being made under pressure to avoid the necessity of shutting off the main. The problem of taking a lateral off a main is not to be confused with taking a service line off of a main or lateral by means of a service T tapped into the top of the main in the usual manner. A service line is much smaller than a main and there is ordinarily no objection to it being at a higher level. A lateral, on the other hand, is usually of approximately the same size as the main itself, its diameter being, for example, at least half that of the main. Moreover, it is not feasible to connect a lateral to the main with a T of the type used for a service line as this would place the lateral higher than the main and upon connection of service lines to the lateral in the usual manner with the services higher than the lateral, the service lines might well be completely out of the ground. It is hence important to maintain the lateral at approximately the same level as the main.

In connecting a lateral with a main it has been proposed to use a fitting having a valve controlled opening through which a cutting tool may be inserted to cut a hole in the main after the fitting is installed, the valve being closed and left in place upon removal of the tool. The valve which is thus buried and of no further use considerably increases the cost of the fitting and adds extra parts which are subject to corrosion and ultimate failure. An object of the present invention is to provide a fitting which requires no valve, is of simple construction, is relatively inexpensive to manufacture and can be quickly and easily installed without interrupting the service of the main. Another object of the invention is to provide a fitting for connecting a main with a lateral at approximately the same level in such manner as to provide an unobstructed passage between the main and lateral and permit any liquid in the lateral, for example, condensation in gas lines to drain back into the main, whereby any clogging or restricting of the lateral will be avoided. A further object of the invention is to provide a fitting of the kind described with which a drill for cutting a hole in the main after installation of the fitting may be operated in a vertical position and with its axis intersecting the axis of the main so that there is no tendency for the drill to glance off the main and be deflected laterally. The invention further provides a flexible coupling which will permit considerable flexing of the connected pipes without impairing the tightness and permanency of the joint.

The nature and advantages of the invention will be more fully understood from the following description of the embodiments shown by way of example in the accompanying drawings, in which—

Figure 1:
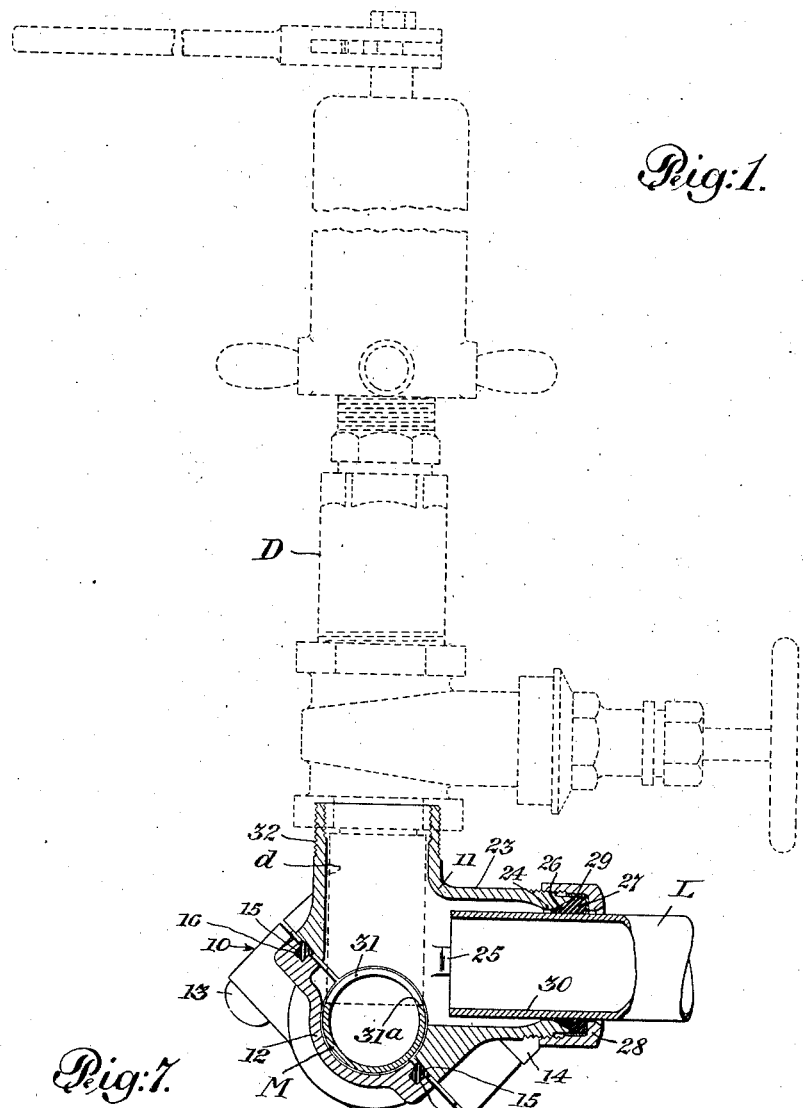
Fig. 1 is a vertical sectional view showing a partially installed fitting in accordance with the invention, and indicating in dotted lines the position of drilling apparatus for cutting a hole in the main.

The fitting illustrated by way of example, in Figs. 1-6, comprises a split sleeve 10 having a pipe aperture extending therethrough to receive the main M and comprising opposed sleeve segments 11 and 12 provided with means for connecting the segments together to clamp the sleeve about the main. In the embodiment shown, the sleeve segments 11 and 12 are connected by means of track head bolts 13, passing through aligned holes in the segments and provided with nuts 14. Longitudinally extending side packings 15 provide a seal between the sleeve segments when the bolts are drawn up to clamp the sleeve about the pipe. The side packings are preferably in the form of rubber gaskets, each of which is set into but projects from a groove 16 in one of the sleeve segments and is adapted to engage the opposed space of the other segment. At each end of the split sleeve 10, there is provided an end packing for effecting a seal between the sleeve and the main. In the form shown, each end packing comprises a gasket 17 of resilient deformable material such as rubber, disposed in an annular gasket recess 18 provided at each end of the sleeve and having a follower 19 movable relative to the sleeve to apply sealing pressure to the gasket. The means for moving the follower 19 is shown as a plurality of cap screws 21 extending through threaded holes in an inwardly extending flange 22 provided at each end of the split sleeve 10 exteriorly of the gasket recess 18. By tightening up on the cap screws 21, to force the follower 19 in toward the inner face of the gasket recess, pressure is applied to the rubber gasket to provide a flexible, permanent, fluid-tight seal between each end of the sleeve and the main. The gasket and follower ring are preferably made in sections corresponding to the segments of the split sleeve so that the corresponding sections of the gasket and follower may be assembled in the gasket recesses of each sleeve segment before the sleeve is applied to the pipe.

Figure 3:
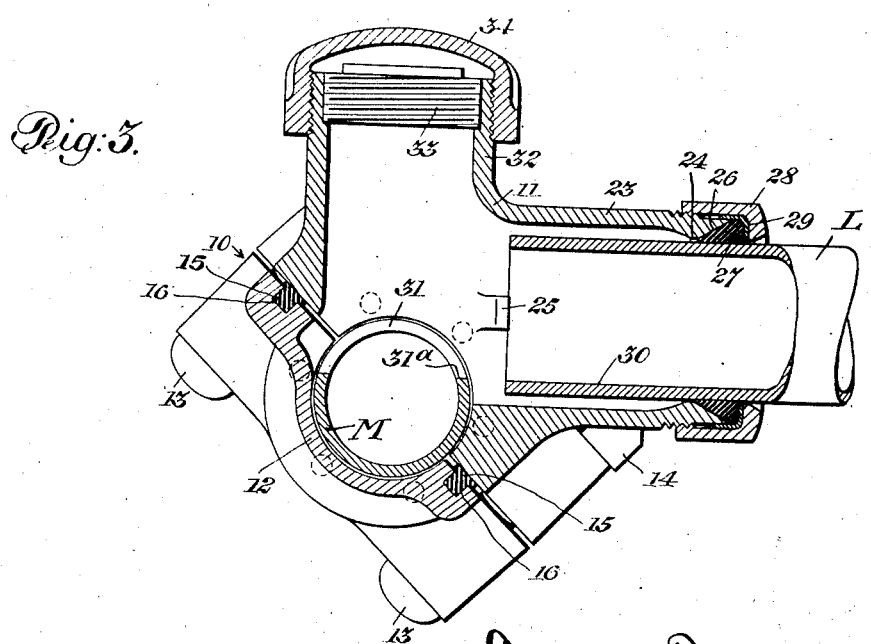
Fig. 3 is a vertical section taken on the line 3—3 of Fig. 2.
Figure 4:
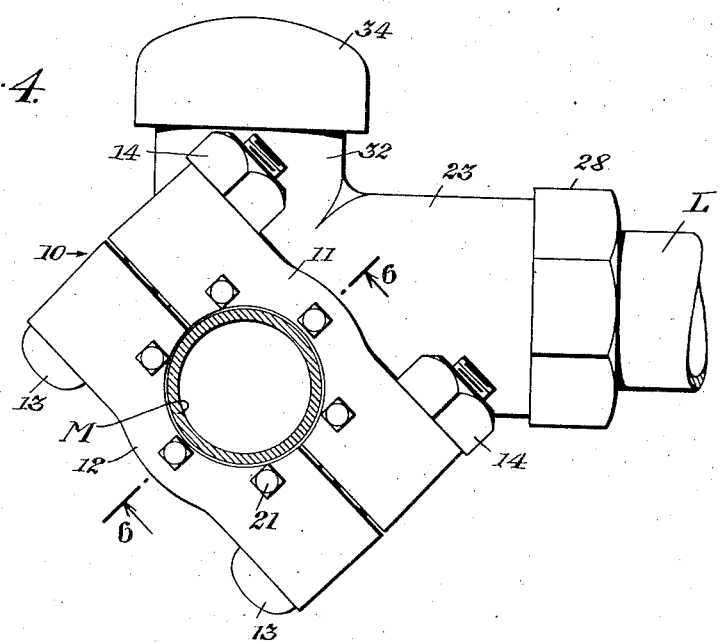
Fig. 4 is a sectional view taken on the line 4—4 in Fig. 2 and showing the fitting in end elevation.
Figure 5:
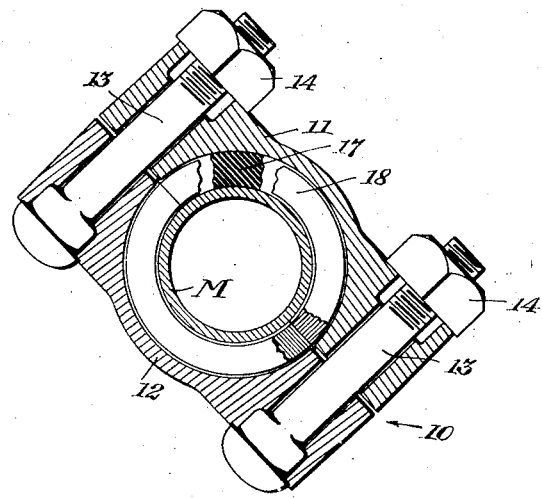
Fig. 5 is a sectional view taken on the line 5—5 of Fig. 2 and having a portion of the follower ring broken away to show the gasket construction.
Figure 6:
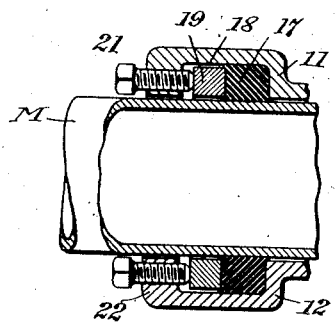
Fig. 6 is a sectional view taken on the line 6—6 of Fig. 4.

One segment 11 of the sleeve 10 is provided with a laterally extending branch outlet for connection with the lateral pipe L. As best shown in Fig. 3, the branch outlet comprises an annular projecting portion 23 providing a pipe aperture 24 of proper size to receive the end of the lateral. It will be understood that the lateral is approximately the same size as the main, its diameter being at least approximately half the diameter of the main. A stop 25 is preferably provided in the branch outlet to limit the extent to which the lateral pipe can be inserted. Adjacent the pipe aperture 24, the internal diameter of this branch outlet is enlarged to form a gasket recess 26 to accommodate a gasket 27 which is preferably formed of resilient deformable material such as rubber. Sealing pressure may be applied to the gasket by a follower nut 28 having internal threads engaging external threads provided on the annular projecting portion 23. A follower ring 29 of metal, fibre, plastic material or the like may be interposed between the gasket and the follower nut 28 to facilitate turning the nut and avoid shearing stress on the gasket. The gasket, follower ring and follower nut are preferably loosely assembled on the branch outlet of the sleeve segment prior to installation of the fitting so that the lateral L may be connected to the outlet merely by inserting the end of the lateral into the annular projecting portion 23 and thereafter tightening the follower nut 28. As the inner end of the lateral L is free from the annular wall of the branch outlet, the rubber gasket forms a flexible connection between the lateral and the fitting and permits relative movement of the lateral without impairing the tightness of the joint. While the lateral is connected with the branch outlet 23 at approximately the same level as the main M, the lower inner wall of the lateral designated by the numeral 30, is not substantially lower than the axis of the longitudinally extending pipe aperture of the split sleeve 10 or in other words, the axis of the main, and is shown as being slightly above said axis. When a hole 31 is drilled in the main as described below, the lower inner wall 30 of the lateral is substantially level with or above the lower edge 31a of the hole in the main so that any liquid in the lateral, for example, condensation in a gas line, will drain back into the main and will not obstruct or restrict the entrance to the lateral. It will be seen that a direct and unobstructed passage is provided from the main to the lateral so that maximum flow of fluid can be obtained without appreciable drop in pressure.

The split sleeve 10 is also provided with a drilling branch 32 to admit a drilling tool for cutting a hole in the main after the fitting has been installed thereon. The drilling branch opens vertically upwards and is hence at an angle of approximately 90° from the branch outlet 23 which extends horizontally from the sleeve. This permits the drilling machine to be operated in a vertical position, making it easier to handle and avoiding the necessity of additional excavation to provide room for operating the drilling machine. The drilling outlet 32 is of sufficient size to admit a drill having a diameter approximately as great as that of the main and the axis of the drilling outlet is in approximately the same plane as that of the main or in other words, the axis of the pipe aperture of the split sleeve, so that the axis of the drill will intersect the axis of the main. This arrangement makes it possible to drill a hole in the pipe which will provide free and unobstructed flow of fluid from the main into the lateral and will avoid the trapping of any condensate or other liquid in the mouth of the lateral. At the same time the position of the drilling branch insures that the drill will be centered with respect to the main so that there will be no tendency for it to glance off the pipe and be deflected to one side.

The drilling branch 32 comprises an annular portion or collar projecting vertically upwards from the sleeve and preferably formed in the same sleeve segment as the branch outlet 23. The drilling branch is completely free of any valve or other obstruction or complication and hence provides a simple and inexpensive construction. The annular projecting portion of the drilling branch is preferably threaded both internally and externally. The internal threads are engaged by a thread closure plug 33 screwed into the drilling branch by the drilling machine after a hole has been cut in the main. The external threads provide for connection of the drilling machine to the fitting and after the drilling machine has been removed they are covered by a cap 34 which protects the thread and cooperates with the plug 33 in providing a permanent closure for the drilling branch of the sleeve.

Prior to installation the fitting is preferably pre-assembled for example, at the factory so that each sleeve segment is complete with gaskets, gasket followers, etc. The fitting is installed by placing the split sleeve about the main M, and clamping it in place by means of the bolts 13 which are drawn up tight to apply pressure to the side packings 15 and effect a fluid tight seal between the two halves of the sleeve. The cap screws 21 are then screwed in progressively to apply sealing pressure to the end packings 17 thereby establishing a fluid tight joint between the sleeve and the main. The end of the lateral pipe L is then slipped into the branch outlet 23 until it engages the stop 25 and the follower nut 28 is thereupon tightened to apply pressure to the rubber gasket 27 and provide a tight connection between the branch outlet and the lateral. It will be noted that as the joints both between the main and the fitting and between the fitting and the lateral are through gaskets of elastic deformable material, for example rubber, the fitting provides a flexible coupling permitting relative movement or deflection of the main and lateral without disturbing the permanent tightness of the joints. The lateral line is then completed, the connections being made final and ready for service. A closed type drilling and inserting machine D is then connected to the drilling outlet of the fitting by being screwed onto the external threads thereof, and the drill $d$ which is preferably of approximately the same diameter as the main, is operated to cut a hole 31 in the main (Fig. 1). A hole 31 is cut to such depth that the lower edge 31$a$ of the hole is approximately at the same level as the lower inner wall 30 of the lateral so as to provide a free opening from the main to the lateral and at the same time permit the draining of liquid from the lateral to the main. The drill $d$ is then withdrawn and the plug 33 is inserted by the drilling and inserting machine to close the drilling branch 32. The machine is then removed and cap 33 is screwed onto the external threads of the drilling branch, forming with the plug 33 a permanent closure for the opening. It will be seen that the fitting is easily and quickly installed and that no valve or other relatively expensive equipment is left buried with the fitting upon completion of the installation.

Figure 7:
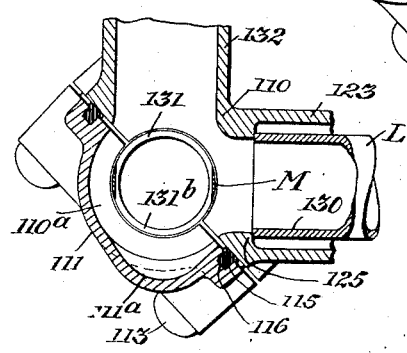
Fig. 7 is a fragmentary sectional view corresponding to Fig. 1 but showing a slightly modified form of fitting.
Figure 2:
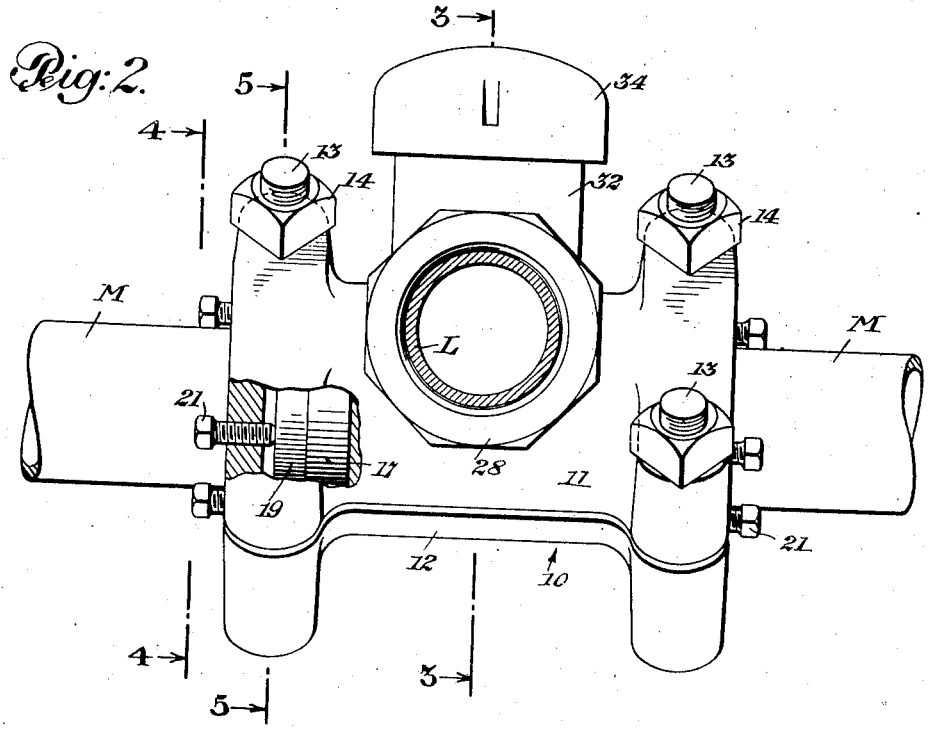
Fig. 2 is a side elevation of the fitting with a portion broken away to show the construction more clearly.

Another embodiment of the invention is shown in Fig. 7 in which corresponding parts are indicated by the same reference numerals as in Figs. 1 to 6 with the addition of 100. The embodiment of Fig. 7 differs from that of Figs. 1 to 6 in that the branch outlet 123 is slightly lower with respect to the axis of the split sleeve 110 so that the lateral is on the same level as or lower than the main M. In installing the fitting, a hole 131 is drilled completely through the main M coming out of the bottom of the main as indicated at 131$b$. A pocket 111$a$ is formed in the lower sleeve segment 111 opposite the drilling branch 132 to provide clearance for the drill so that it will not cut through the lower segment of the sleeve and also provides a pocket for receiving any drip or other liquid draining from the lateral L. The split sleeve 110 is formed to provide an annular passage 110$a$, extending completely around the main adjacent the lateral and the hole in the main to provide particularly free flow of fluid from the main to the lateral. It will be seen that the fitting also permits the drainage of liquid from the lateral back to the main to avoid trapping condensate or other liquid in the mouth of the lateral. Although the main M may be nearly or completely severed by the hole 131 drilled through it, the split sleeve with its gasket of resilient deformable material forms a strong, permanent, tight and yet flexible connection between adjacent portions of the main. The fitting shown in Fig. 7 may be installed in exactly the same manner as that shown in Figs. 1 to 6 except of course that the hole 131 is drilled completely through the main M.

What I claim and desire to secure by Letters Patent is:

1. A pipe fitting for making a connection under pressure between a pipe main and a lateral of approximately the same size and located at approximately the same level as the main, comprising a split sleeve having opposed sleeve segments, bolts for connecting said sleeve segments together, side packings providing a fluid-tight seal between the sleeve segments, said sleeve having at each end an annular packing recess, a gasket of resilient deformable material in said recess, a follower ring movable relative to the sleeve to apply sealing pressure to said gasket, a drilling branch opening vertically from said sleeve, a branch outlet projecting horizontally from said sleeve and having an opening to receive an end of said lateral and an annular packing recess adjacent said opening, an annular gasket of resilient deformable material in said recess and a follower for applying sealing pressure to said gasket.

2. A pipe fitting for making a connection under pressure between a main and a lateral of approximately the same size and at approximately the same level as the main, comprising a split sleeve composed of a plurality of sleeve segments and having a central bore extending longitudinally therethrough to receive the main, means for connecting said segments together, gasket means for effecting a fluid-tight seal between the sleeve and the main, a drilling branch projecting vertically upwards from said sleeve and having a bore approximately as large as said central bore and radially intersecting the central bore, and a separate branch outlet projecting laterally from said sleeve at approximately ninety degrees to said drilling branch and having a bore intersecting the central bore of the sleeve and approximately as large as said central bore, and means for connecting said branch outlet with a lateral.

3. In combination with a pipe main and a lateral not substantially smaller than the main and extending horizontally therefrom at approximately the same level, a pipe fitting connecting said main and lateral, comprising a split sleeve having a central bore through which said main extends, means for connecting segments of the split sleeve together, packing means for effecting a fluid-tight seal between the sleeve segments and between the sleeve and the main, a drilling branch opening upwardly from the central bore of said sleeve to admit a drilling tool of approximately the same diameter as the main to make a hole in said main, and a branch outlet opening horizontally from the central bore of said sleeve, and means for connecting said branch to the lateral, the adjacent end of said lateral being approximately level with the hole in the main to provide a direct path for flow of fluid from the main to the lateral and unobstructed drainage from the lateral into the main.

FREDERICK T. NEWELL.